US008644248B2

(12) United States Patent
Koh et al.

(10) Patent No.: US 8,644,248 B2
(45) Date of Patent: Feb. 4, 2014

(54) TERMINAL HAVING SCTP-BASED HANDOVER FUNCTION AND SCTP-BASED HANDOVER METHOD OF THE TERMINAL

(75) Inventors: Seok-Joo Koh, Daegu-si (KR); Dong-Phil Kim, Busan (KR)

(73) Assignees: Samsung Electronics Co., Ltd., Suwon-Si (KR); Kyungpook National University Industry-Academic Cooperation Foundation, Daegu (KR)

( * ) Notice: Subject to any disclaimer, the term of this patent is extended or adjusted under 35 U.S.C. 154(b) by 1234 days.

(21) Appl. No.: 11/915,457

(22) PCT Filed: May 25, 2006

(86) PCT No.: PCT/KR2006/001972
§ 371 (c)(1),
(2), (4) Date: Nov. 26, 2007

(87) PCT Pub. No.: WO2006/126838
PCT Pub. Date: Nov. 30, 2006

(65) Prior Publication Data
US 2008/0205341 A1    Aug. 28, 2008

(30) Foreign Application Priority Data

May 27, 2005    (KR) .................. 10-2005-0045096

(51) Int. Cl.
*H04W 4/00*    (2009.01)
(52) U.S. Cl.
USPC ........................................ 370/331
(58) Field of Classification Search
None
See application file for complete search history.

(56) References Cited

U.S. PATENT DOCUMENTS

| 6,768,726 | B2 | 7/2004 | Dorenbosch et al. | |
|---|---|---|---|---|
| 6,850,503 | B2* | 2/2005 | Dorenbosch et al. | 370/331 |
| 7,003,290 | B1* | 2/2006 | Salonaho et al. | 455/423 |
| 7,697,940 | B2 | 4/2010 | Jung et al. | |
| 2003/0162543 | A1 | 8/2003 | Auranen et al. | |

(Continued)

FOREIGN PATENT DOCUMENTS

| JP | 2004-140545 | 5/2004 |
|---|---|---|
| JP | 2005-252623 | 9/2005 |

(Continued)

OTHER PUBLICATIONS

Stewart et al. SCTP Extensions for Dynamic Reconfiguration of IP Addresses, Nov. 19, 2001.* Decision on Grant issued in corresponding Russian Application No. 2007143976/09(048182) dated Feb. 3, 2009.

(Continued)

*Primary Examiner* — John Blanton
(74) *Attorney, Agent, or Firm* — Staas & Halsey LLP

(57) ABSTRACT

A terminal having a stream control transmission protocol (SCTP)-based handover function and an SCTP-based handover method, the terminal including: a session management unit to initiate an SCTP session with a second terminal; a link layer information collection unit to store beacon signals in a link layer state information database; a signal intensity extraction unit to, if the terminal enters an overlapping area of first and second communication areas, extract an intensity of a beacon signal transmitted by a second base station managing the second communication area from the link layer state information database; and a handover unit to, if the intensity is greater than a critical value, add an IP address received from the second base station to the SCTP session, and to, if the intensity is greater than a second critical value, requests the second terminal to communicate with the terminal using the received IP address.

8 Claims, 5 Drawing Sheets

(56) References Cited

U.S. PATENT DOCUMENTS

| | | | |
|---|---|---|---|
| 2004/0028009 | A1 | 2/2004 | Dorenbosch et al. |
| 2004/0030791 | A1 | 2/2004 | Dorenbosch et al. |
| 2004/0082330 | A1 | 4/2004 | Marin |
| 2004/0196808 | A1* | 10/2004 | Chaskar et al. ............... 370/331 |
| 2005/0089007 | A1 | 4/2005 | Semper |
| 2005/0213545 | A1* | 9/2005 | Choyi et al. ................. 370/338 |
| 2006/0083184 | A1 | 4/2006 | Haumont et al. |
| 2006/0142004 | A1* | 6/2006 | He et al. ........................ 455/434 |
| 2007/0243871 | A1 | 10/2007 | Chen et al. |
| 2008/0104254 | A1 | 5/2008 | Hukkanen |

FOREIGN PATENT DOCUMENTS

| | | |
|---|---|---|
| KR | 10-2005-0038736 | 4/2005 |
| RU | 2003127839 | 2/2002 |
| RU | 2004125491 | 2/2003 |
| WO | WO 99/43178 | 8/1999 |
| WO | 2004/013998 A2 | 2/2004 |

OTHER PUBLICATIONS

Chinese Office Action dated Oct. 12, 2010 in related Chinese Patent Application No. 200680018405.1.
Japanese Office Action issued Jul. 5, 2011 in corresponding Japanese Patent Application 2008-513369.
Chinese Office Action issued May 25, 2011 in corresponding Chinese Patent Application 200680018405.1.
Canadian Office Action dated Dec. 14, 2011 issued in corresponding Canadian Patent Application No. 2,609,717.
Extended European Search Report issued May 27, 2013 in corresponding European Application No. 06768621.2.
Seok Joo Koh et al., "mSCTP for Soft Handover in Transport Layer", IEEE Communications Letters, vol. 8, No. 3, Mar. 2004, pp. 189-191.
Seok J. Koh et al., "Mobile SCTP for Transport Layer Mobility", Internet Draft, <draft-sjkoh-sctp-mobility-04.txt>, Jun. 2004, pp. 1-16.
Seok Joo Koh, et al., "Use of SCTP for Seamless Handover", Internet Draft, <draft-sjkoh-mobile-sctp-handover-00.text>, Feb. 2003, pp. 1-11.

* cited by examiner

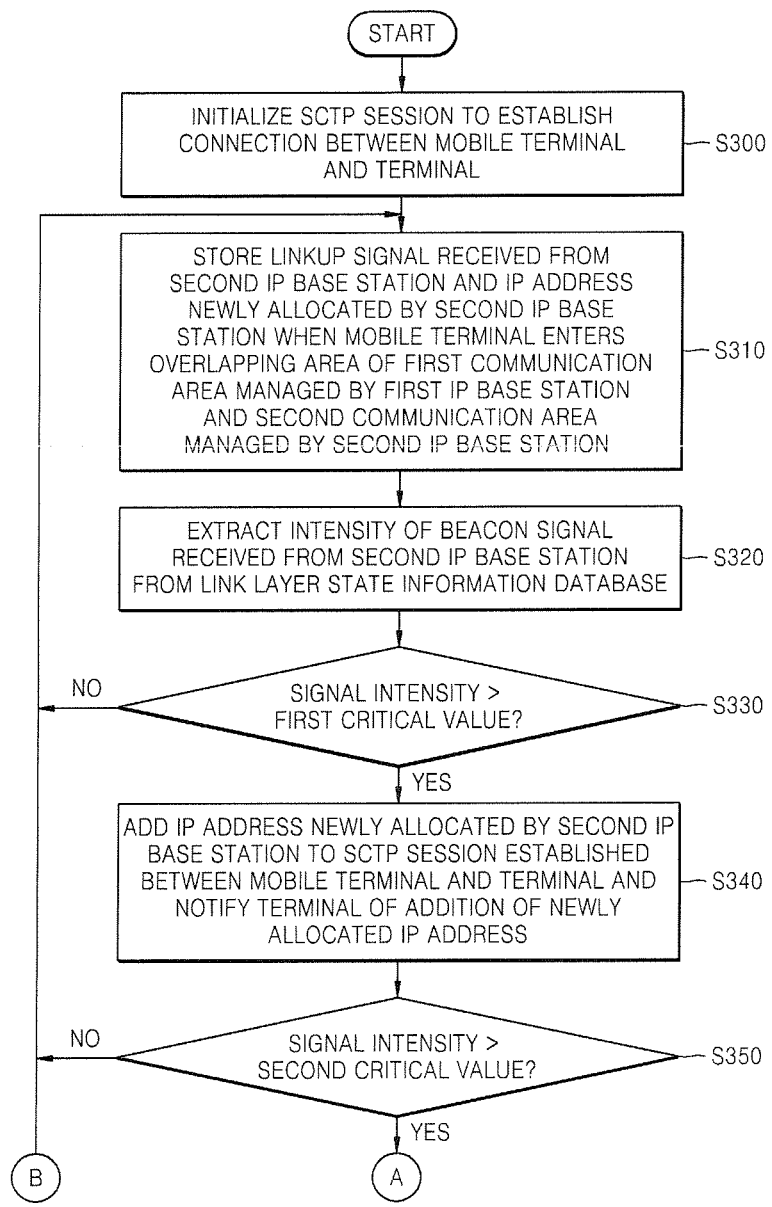

TERMINAL HAVING SCTP-BASED HANDOVER FUNCTION AND SCTP-BASED HANDOVER METHOD OF THE TERMINAL

CROSS-REFERENCE TO RELATED APPLICATIONS

This application is a PCT national stage application of International Application No. PCT/KR2006/001972, filed on May 25, 2006, which claims the benefit of Korean Patent Application No. 2005-45096, filed on May 27, 2005 in the Korean Intellectual Property Office, the disclosures of which are incorporated herein by reference.

BACKGROUND OF THE INVENTION

1. Field of the Invention

Aspects of the present invention relate to a terminal having a stream control transmission protocol (SCTP)-based handover function and an SCTP-based handover method of the terminal, and more particularly, to a terminal capable of guaranteeing an efficient IP mobility in a wireless communication network by seamlessly handing over application services using the SCTP and an SCTP-based handover method of the terminal.

2. Description of the Related Art

Conventionally, in order to guarantee IP mobility, a first mobile terminal must register IP address information used in communication with a second mobile terminal with a location management server, and the second mobile terminal must establish a connection to the first mobile terminal using the IP address information registered with the location management server. According to this conventional method, however, additional investment in network equipment, such as the location management server, is required. In addition, in order to support a handover of a mobile terminal, a tunneling operation needs to be performed between routers, and a network architecture needs to be fundamentally changed. In this regard, the aforementioned conventional method cannot guarantee an efficient handover.

SUMMARY OF THE INVENTION

Aspects of the present invention provide a terminal performing a stream control transmission protocol (SCTP)-based handover with the aid of a module that offers IP mobility without the aid of network equipment, and an SCTP-based handover method of the terminal.

Aspects of the present invention also provide a computer-readable recording medium storing a computer program for executing an SCTP-based handover method in which a module that offers IP mobility can perform a SCTP-based handover without the aid of network equipment.

According to an aspect of the present invention, there is provided a first terminal having a stream control transmission protocol (SCTP)-based handover function that includes: a session management unit which initiates a SCTP session for communication with a second terminal through the Internet and terminates a SCTP session established between the first terminal and the second terminal for terminating communication between the first terminal and the second terminal; a link layer information collection unit which receives beacon signals from a plurality of base stations connected to a router which is connected to the Internet and stores the beacon signals in a link layer state information database; a signal intensity extraction unit which, if the first terminal enters an overlapping area of a first communication area managed by a first base station and a second communication area managed by a second base station while the SCTP session is established between the first terminal and the second terminal, extracts the intensity of a beacon signal transmitted by the second base station from the link layer state information database; and a handover unit which, if the extracted beacon signal intensity is greater than a first critical value, adds an IP address received from the second base station to the SCTP session established between the terminal and the other terminal, and if the extracted beacon signal intensity is greater than a second critical value, requests the second terminal to communicate with the first terminal using the IP address received from the second base station.

According to another aspect of the present invention, there is provided a SCTP-based handover method that includes: initiating a SCTP session for communication between a first terminal and a second terminal through the Internet; receiving beacon signals from a plurality of base stations connected to a router which is connected to the Internet and storing the beacon signals in a link layer state information database; if the first terminal enters an overlapping area of a first communication area managed by a first base station and a second communication area managed by a second base station while the SCTP session is established between the first terminal and the second terminal, extracting the intensity of a beacon signal transmitted by the second base station from the link layer state information database; and if the extracted beacon signal intensity is greater than a first critical value, adding an IP address received from the second base station to the SCTP session established between the first terminal and the second terminal, and if the extracted beacon signal intensity is greater than a second critical value, requesting the second terminal to communicate with the first terminal using the IP address received from the second base station.

Accordingly, it is possible to reduce investment in network equipment and offer an efficient handover method by adding a SCTP stack to mobile terminals.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 3A and 3B are flowcharts illustrating an SCTP-based handover method according to an embodiment of the present invention.

DETAILED DESCRIPTION OF THE EMBODIMENTS

Figure 1:
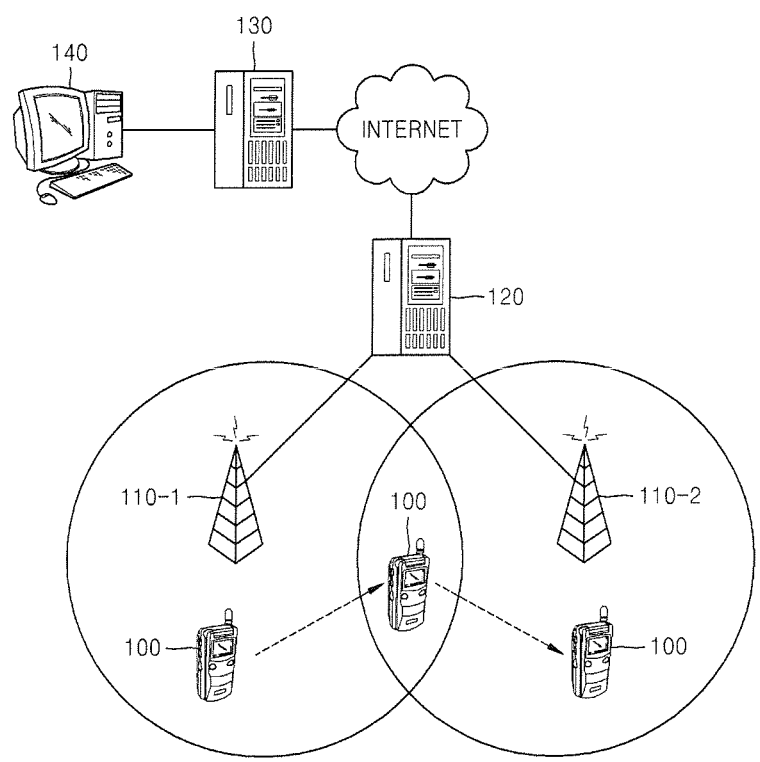
FIG. 1 is a diagram illustrating a network including terminals having a stream control transmission protocol (SCTP)-based handover function according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a diagram illustrating a network including terminals having a stream control transmission protocol (SCTP)-based handover function according to an embodiment of the present invention. Referring to FIG. 1, the network includes a mobile terminal 100, first and second IP base stations 110-1 and 110-2, a first router 120, a second router 130, and a correspondent terminal 140.

An SCTP stack is installed in the mobile terminal 100. An IP address for communication is allocated to the mobile terminal 100 by the first and second IP base stations 110-1 and 110-2 which manage a respective communication area in which the mobile terminal 100 is located. The first and second IP base stations 110-1 and 110-2 are located between the mobile terminal 100 and the first router 120, and relay signals transmitted between the first mobile station 100 and the first router 120. The mobile terminal 100 enters first and second communication areas managed by the first and second IP base stations 110-1 and 110-2, respectively. In other words, the first and second IP base stations 110-1 and 110-2 transmit an SCTP data packet transmitted by the mobile terminal 100 to the first router 120 and transmit an SCTP data packet which is destined for the mobile terminal 100 to the mobile terminal 100. In addition, the first and second IP base stations 110-1 and 110-2 transmit a beacon signal and allocate IP addresses to the mobile terminal 100 that enters the first and second communication areas.

The first router 120, which is connected to the Internet, transmits an SCTP data packet transmitted by the first and second IP base stations 110-1 and 110-2 to the second router 130, which manages the correspondent terminal 140. Furthermore, the first router 120 transmits an SCTP data packet that is destined for the mobile terminal 100 to the first and second IP base stations 110-1 and 110-2, which manage the first and second communication areas, respectively, where the mobile station 100 is located. The second router 130 transmits an SCTP data packet transmitted by the correspondent terminal 140 to the first router 120 that manages the mobile terminal 100 and transmits an SCTP data packet that is destined for the correspondent terminal 140 to the correspondent terminal 140. An SCTP stack is installed in the correspondent terminal 140, thus enabling the correspondent terminal 140 to communicate with the mobile terminal 100 according to the SCTP. The correspondent terminal 140 is illustrated in FIG. 1 as being fixed to a certain location, such as a fixed server. However, it is understood that the correspondent terminal 140 may be a mobile device (such as a mobile phone), a personal digital assistant (PDA), or a laptop computer. Accordingly, it is understood that the correspondent terminal 140 may communicate with other terminals with the aid of routers and IP base stations.

In the network illustrated in FIG. 1, the mobile terminal 100 that is located in the first communication area managed by the first IP base station 110-1 and establishes a communication path to the correspondent terminal 140. Then, the mobile terminal 100 and the correspondent terminal 140 transmit/receive data to/from each other through the communication path established therebetween. If the mobile terminal 100 enters the second communication area managed by the second IP base station 110-2 while communicating with the correspondent terminal 140, the mobile terminal 100 senses a new link-up signal (e.g., base station information included in a beacon signal) transmitted by the second IP base station 110-2 through a link layer, and a new IP address is allocated to the mobile terminal 100 by the second IP base station 110-2. Thereafter, the mobile terminal 100 adds the newly allocated IP address to an SCTP session, thereby performing a handover.

Figure 2:
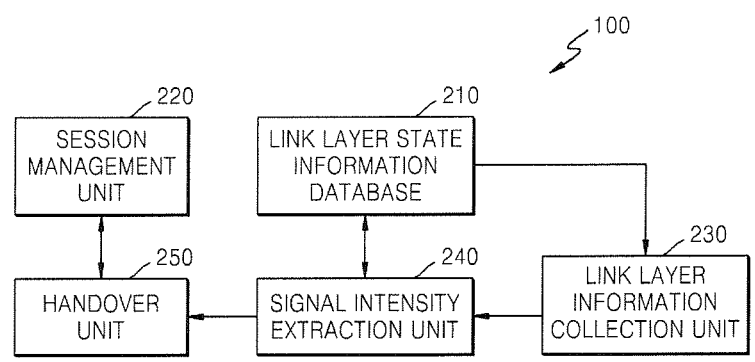
FIG. 2 is a block diagram of a terminal having an SCTP-based handover function according to an embodiment of the present invention.

FIG. 2 is a block diagram of the mobile terminal 100 having an SCTP-based handover function according to an embodiment of the present invention. Referring to FIG. 2, the mobile terminal 100 includes a link layer state information database 210, a session management unit 220, a link layer information collection unit 230, a signal intensity extraction unit 240, and a handover unit 250. The link layer state information database 210 stores beacon signals transmitted by the first and second IP base stations 110-1 and 110-2, IP addresses allocated by the first and second IP base stations 110-1 and 110-2, and information specifying intensities of the beacon signals. The session management unit 220 initiates an SCTP session for IP communication between the mobile terminal 100 and the correspondent terminal 140 through the Internet and terminates an SCTP session established between the mobile terminal 100 and the correspondent terminal 140. The link layer information collection unit 230 stores beacon signals transmitted by the first and second IP base stations 110-1 and 110-2 in the link layer state information database 210. When the mobile terminal 100 moves from a first communication area managed by the first IP base station 110-1 to an overlapping area of the first communication area and a second communication area managed by the second IP base station 110-2 while an SCTP session is established between the mobile terminal 100 and the correspondent terminal 140, the signal intensity extraction unit 240 extracts the intensity of the beacon signal transmitted by the second IP base station 110-2 from the link layer state information database 210.

If the extracted beacon signal intensity is greater than a first critical value, the handover unit 250 adds an IP address received from the second IP base station 110-2 to the SCTP session established between the mobile terminal 100 and the correspondent terminal 140. If the extracted beacon signal intensity is greater than a second critical value, the handover unit 250 requests the correspondent terminal 140 to communicate with the mobile terminal 100 using the IP address received from the second IP base station 110-2 and added to the SCTP session.

Figure 3B:
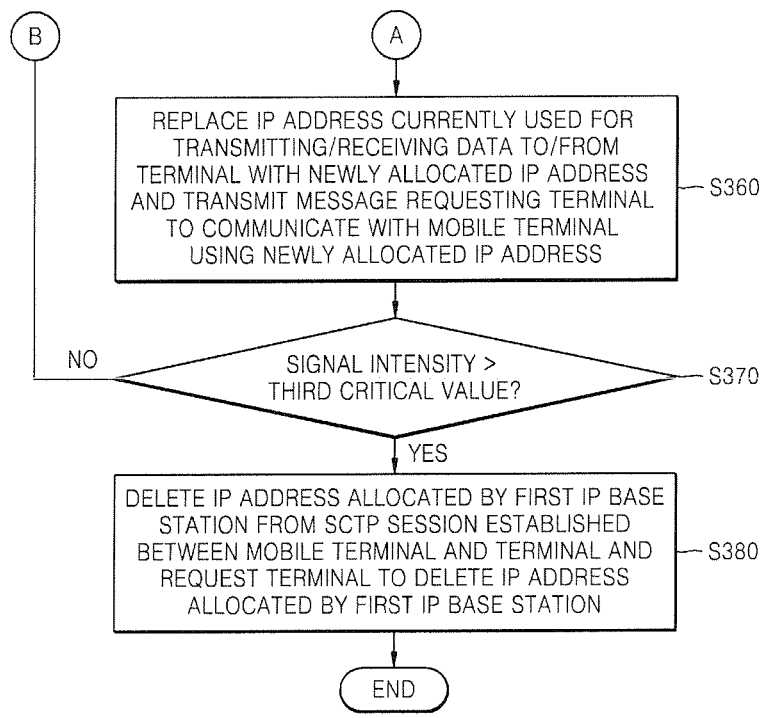

FIGS. 3A and 3B are flowcharts illustrating an SCTP-based handover method according to an embodiment of the present invention. Referring to FIG. 3, in operation S300, the session management unit 220 initializes an SCTP session to establish a connection between the mobile terminal 100 and the correspondent terminal 140. In operation S310, when the mobile terminal 100 enters the overlapping area of the first communication area managed by the first IP base station 110-1 and the second communication area managed by the second IP base station 110-2, the link layer information collection unit 230 stores a linkup signal transmitted by the second IP base station 110-2 and an IP address newly allocated to the mobile terminal 100 by the second IP base station 110-2 in the link layer state information database 210. In operation S320, the signal intensity extraction unit 240 extracts the intensity of a beacon signal transmitted by the second IP base station 110-2 from the link layer state information database 210.

In operation S330, the handover unit 250 determines whether the intensity of the beacon signal transmitted by the second IP base station 110-2 is greater than a first critical value. If the intensity is not greater than the first critical value (operation S330), operation S310 is performed again. In operation S340, if the intensity of the beacon signal transmitted by the second IP base station 110-2 is greater than the first critical value (operation S330), the handover unit 250 adds the newly allocated IP address to the SCTP session established between the mobile terminal 100 and the correspondent terminal 140 and notifies the correspondent terminal 140 of the addition of the newly allocated IP address to the SCTP session established between the mobile terminal 100 and the correspondent terminal 140. Thereafter, in operation S350, the handover unit 250 determines whether the intensity of the linkup signal transmitted by the second IP base station 110-2 is greater than a second critical value. If the intensity is not greater than the second intensity (operation S350), operation S310 is performed again. In operation S360, if the intensity of the linkup signal transmitted by the second IP base station 110-2 is greater than the second critical value (operation S350), the handover unit 250 replaces an IP address currently used for transmitting/receiving data to/from the correspondent terminal 140 with the newly allocated IP address and transmits a message to the correspondent terminal 140 that requests the correspondent terminal 140 to communicate with the mobile terminal 100 using the newly allocated IP address. Thereafter, when the mobile terminal 100 leaves the first communication area managed by the first IP base station 110-1, the mobile terminal 100 senses a link-down signal (i.e., the intensity is greater than a third critical value) for the first communication area managed by the first IP base station 110-1 in operation S370. Accordingly, in operation S380, the mobile terminal 100 deletes an IP address allocated to the mobile terminal 100 by the first IP base station 110-1 from the SCTP session established between the mobile terminal 100 and the correspondent terminal 140 and requests the correspondent terminal 140 to delete an IP address allocated to the correspondent terminal 140 by the first IP base station 110-1. In this manner, the mobile terminal 100 can continuously perform a handover operation during a predetermined SCTP session in a mobile network. If the intensity remains less than the third critical value in operation S370, operation S310 is performed again.

Figure 4:
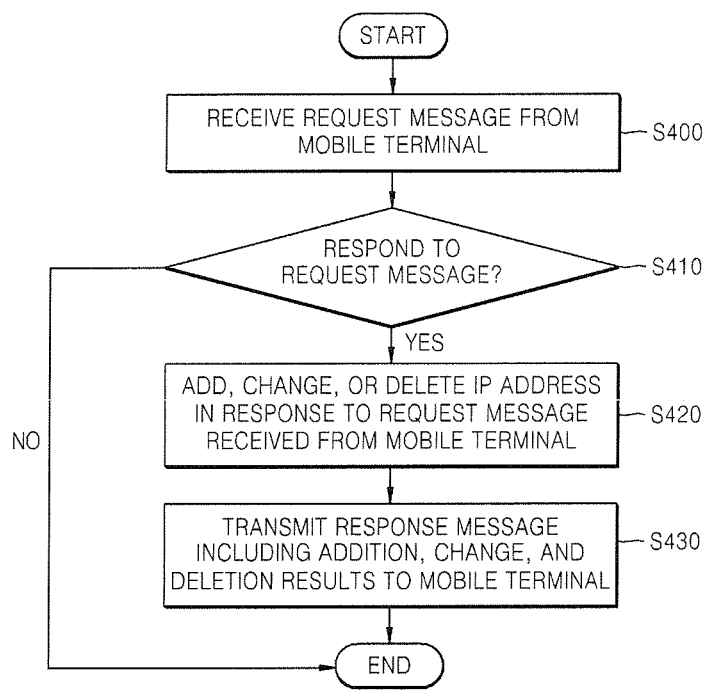
FIG. 4 is a flowchart illustrating a method whereby a terminal that communicates with a terminal having an SCTP-based handover function according to an embodiment of the present invention processes a message received from the terminal according to an embodiment of the present invention.

FIG. 4 is a flowchart illustrating a method whereby a terminal 140 that communicates with a terminal 100 having an SCTP-based handover function according to an embodiment of the present invention processes a message received from the terminal according to an embodiment of the present invention. Referring to FIG. 4, in operation S400, the correspondent terminal 140 receives a request message from the mobile terminal 100. In operation S410, the correspondent terminal 140 determines whether to respond to the request message. The request message may be a message that requests the correspondent terminal 140 to notify the mobile terminal 100 whether a newly allocated IP address has been established, a message that requests the correspondent terminal 140 to change an IP address currently used for transmitting/receiving data, or a message that requests the correspondent terminal 140 to delete a pre-existing IP address. In operation S420, if the correspondent terminal 140 decides to respond to the request message (operation S410), the correspondent terminal 140 performs a predetermined operation according to the request message. If the terminal 140 decides not to respond, then the method ends. In operation S430, the correspondent terminal 140 transmits a response message including the predetermined operation results to the mobile terminal 100. The request message and the response message may be transmitted with the aid of SCTP control packets.

Aspects of the present invention can be realized as computer-readable code written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, and an optical data storage. The computer-readable recording medium can be distributed over a plurality of computer systems connected to a network so that computer-readable code is written thereto and executed therefrom in a decentralized manner. Functional programs, code, and code segments needed for realizing aspects of the present invention can be easily construed by one of ordinary skill in the art. Aspects can also be implemented as computer-readable code written in a carrier wave (e.g., data transmission over the Internet).

According to aspects of the present invention, it is possible to enable a SCTP-based IP handover operation in a next-generation all IP-based wireless communication network by using link layer signals. In addition, since aspects of the present invention can be applied to a handover between different types of networks (for example, between an IEEE 802.16-based WiBro network and a wireless LAN), and to a handover between WLANs of the same type, it is possible to enable repetitive handovers during a single session. Moreover, it is possible to offer an efficient handover method by additionally installing an SCTP stack in a terminal as a hardware device or a software program without additionally investing in network equipment.

Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:

1. A mobile terminal for performing a stream control transmission protocol (SCTP)-based handover, the terminal comprising:

a session management unit capable of initiating an SCTP session for communication with another terminal through an Internet and terminating an SCTP session established between the mobile terminal and the another terminal;

a receiver capable of receiving beacon signals from a plurality of base stations, the receiver connected to a first router that is connected to the Internet, and storing the beacon signals in a link layer state information database;

a signal intensity extraction unit that, if the mobile terminal enters an overlapping area of a first communication area managed by both a first one of the plurality of base stations and a second communication area managed by a second one of the plurality of the base stations while an SCTP session is established between the mobile terminal and the another terminal with a first IP address received from the first one of the plurality of base stations, extracts an intensity of a beacon signal transmitted by the second base station from the stored link layer state information database; and a handover unit, if the extracted beacon signal intensity is greater than a first critical value, that adds a second IP address received from the second base station to the SCTP session established between the mobile terminal and the another terminal, and transmit a request to the another terminal to add the second IP address to the SCTP session, if the extracted beacon signal intensity is greater than a second critical value other than the first critical value, that transmits a request to the another terminal to communicate with the mobile terminal using the second IP address received from the second one of the plurality of the base stations, wherein the first and the second of the plurality of base stations are connected to the first router connected to the Internet in order to transmit and receive data to/from the another terminal, and the another terminal is connected to a second router connected to the Internet in order to transmit and receive data to/from the mobile terminal.

2. The mobile terminal of claim 1, wherein, if the extracted beacon signal intensity is greater than a third critical value, the handover unit requests the another terminal to delete an IP address received from the first base station for the SCTP session established between the mobile terminal in the first communication area and the another terminal.

3. The mobile terminal of claim 1, wherein the first base station and the second base station are connected to a first router connected to the Internet in order to transmit and to receive data to/from the another terminal, and the another terminal is connected to a second router connected to the Internet in order to transmit and receive data to/from the terminal.

4. The mobile terminal of claim 1, wherein, if the extracted beacon signal intensity is greater than the second critical value, the handover unit transmits a request to the another terminal to confirm that the another terminal communicates with the terminal using the second IP address received from the second base station.

5. A stream control transmission protocol (SCTP)-based handover method comprising:
   initiating an SCTP session for communication between a first terminal in a first communication area and a second terminal connected to the first terminal through an Internet using a first base station with a first IP address received from the first base station;
   receiving a beacon signal from a second base station managing a second communication area and connected to a first router that is connected to the Internet;
   storing the beacon signal in a link layer state information database;
   if the first terminal enters an overlapping area of the first communication area managed by both the first base station and the second communication area while the SCTP session is established between the first terminal and the second terminal, extracting an intensity of the beacon signal transmitted by the second base station from the link layer state information database;
   if the extracted beacon signal intensity is greater than a first critical value, adding a second IP address received from the second base station to the SCTP session established between the first terminal and the second terminal and transmitting a request to the second terminal to add the second IP address to the SCTP session; and
   if the extracted beacon signal intensity is greater than a second critical value, transmitting a request to the second terminal to communicate with the first terminal using the second IP address received from the second base station, wherein the first base station and the second base station are connected to the first router connected to the Internet in order to transmit and receive data to/from the second terminal, and the second terminal is connected to a second router connected to the Internet in order to transmit and receive data to/from the first terminal.

6. The SCTP-based handover method of claim 5, further comprising, if the extracted beacon signal intensity is greater than a third critical value, requesting the second terminal to delete the first IP address.

7. The SCTP-based handover method of claim 5, wherein the transmitting the request of the second terminal to communicate with the first terminal using the second IP address received from the second base station comprises requesting the second terminal to confirm that the second terminal communicates with the first terminal using the second IP address received from the second base station.

8. A non-transitory computer-readable recording medium storing a computer program for executing a stream control transmission protocol (SCTP)-based handover method, the SCTP-based handover method comprising:
   initiating a SCTP session for communication between a first terminal in a first communication area and a second terminal connected to the first terminal through an Internet using a first base station with a first IP address received from the first base station;
   receiving a beacon signal from a second base station managing a second communication area and connected to a first router that is connected to the Internet;
   storing the beacon signal in a link layer state information database;
   if the first terminal enters an overlapping area of the first communication area managed by both the first base station and the second communication area while the SCTP session is established between the first terminal and the second terminal, extracting an intensity of the beacon signal transmitted by the second base station from the link layer state information database;
   if the extracted beacon signal intensity is greater than a first critical value, adding a second IP address received from the second base station to the SCTP session established between the first terminal and the second terminal and transmitting a request to the second terminal to add the second IP address to the SCTP session; and
   if the extracted beacon signal intensity is greater than a second critical value, transmitting a request to the second terminal to communicate with the first terminal using the second IP address received from the second base station,
   wherein the first base station and the second base station are connected to the first router connected to the Internet in order to transmit and receive data to/from the second terminal, and the second terminal is connected to a second router connected to the Internet in order to transmit and receive data to/from the first terminal.

* * * * *